(12) United States Patent
Moore et al.

(10) Patent No.: US 10,616,208 B2
(45) Date of Patent: *Apr. 7, 2020

(54) UNIFIED MOBILE SECURITY SYSTEM AND METHOD OF OPERATION

(71) Applicant: AT&T MOBILITY IP, LLC, Atlanta, GA (US)

(72) Inventors: Dustin Michael Moore, San Jose, CA (US); R. Travis Jones, Lake Zurich, IL (US); Bruce Blaine Lacey, Foster City, CA (US)

(73) Assignee: AT&T MOBILITY IP, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,504

(22) Filed: May 15, 2018

(65) Prior Publication Data

US 2018/0270222 A1 Sep. 20, 2018

Related U.S. Application Data

(62) Division of application No. 13/726,580, filed on Dec. 25, 2012, now Pat. No. 9,973,492.

(51) Int. Cl.
*H04L 29/06* (2006.01)
*H04L 9/32* (2006.01)
(Continued)

(52) U.S. Cl.
CPC .......... *H04L 63/0823* (2013.01); *H04L 9/321* (2013.01); *H04L 63/126* (2013.01);
(Continued)

(58) Field of Classification Search
CPC ... H04L 63/0823; H04L 63/123; H04L 9/321; H04L 9/3263; H04W 12/06; H04W 12/02; H04W 4/14
See application file for complete search history.

(56) References Cited

U.S. PATENT DOCUMENTS

2004/0073801 A1* 4/2004 Kalogridis ............ G06F 21/305
713/176
2004/0139163 A1 7/2004 Adams et al.
(Continued)

OTHER PUBLICATIONS

Carrier IQ "Understanding Carrier IQ Technology" Dec. 12, 2011, pp. 1-19 http://www.franken.senate.gOv/files/letter/111212_CarrierIQ_Attachment.pdf (Year: 2011).*

(Continued)

*Primary Examiner* — Robert B Leung
*Assistant Examiner* — Carlos M De Jesus Lassala
(74) *Attorney, Agent, or Firm* — Workman Nydegger

(57) ABSTRACT

A mobile secure agent on a wireless device executes one or more authenticated data collection profiles provisioned by a private profile producer. Each data package can only be transmitted to a collector certificated by the same private profile producer. Update profiles are signed and provisioned through a tunnel initiated from the mobile secure agent. A Certificate Authority provides libraries, anchors, and certificates in a key management message module to each mobile secure agent which enables revocation and replacement of certificates. Data stored in this way on a wireless device may only be transmitted in encrypted form to an authenticated destination.

18 Claims, 6 Drawing Sheets

(51) Int. Cl.
*H04W 12/06* (2009.01)
*H04W 4/14* (2009.01)
*H04W 12/00* (2009.01)
*H04L 9/00* (2006.01)
*H04W 12/02* (2009.01)

(52) U.S. Cl.
CPC ............ *H04W 4/14* (2013.01); *H04W 12/001* (2019.01); *H04W 12/06* (2013.01); *H04L 9/006* (2013.01); *H04L 9/3263* (2013.01); *H04L 29/06775* (2013.01); *H04W 12/02* (2013.01)

(56) References Cited

U.S. PATENT DOCUMENTS

| | | | |
|---|---|---|---|
| 2005/0076215 A1 | 4/2005 | Dryer | |
| 2005/0148323 A1* | 7/2005 | Little | H04L 12/66 455/414.1 |
| 2005/0154795 A1 | 7/2005 | Kuz et al. | |
| 2007/0076646 A1* | 4/2007 | Foster | H04L 12/1854 370/315 |
| 2007/0169073 A1* | 7/2007 | O'Neill | G06F 8/61 717/168 |
| 2008/0022345 A1* | 1/2008 | Kim | H04N 7/163 725/131 |
| 2008/0022354 A1 | 1/2008 | Grewal et al. | |
| 2008/0222368 A1* | 9/2008 | Gehrmann | G06F 21/572 711/152 |
| 2009/0227274 A1 | 9/2009 | Adler et al. | |
| 2009/0265775 A1 | 10/2009 | Wisely et al. | |
| 2009/0296633 A1* | 12/2009 | Kitahara | G06F 21/31 370/328 |
| 2011/0085650 A1 | 4/2011 | Cheon et al. | |
| 2013/0189953 A1 | 7/2013 | Mathews | |
| 2013/0191903 A1 | 7/2013 | Jaudon et al. | |
| 2015/0089613 A1 | 3/2015 | Tippett et al. | |
| 2015/0181548 A1 | 6/2015 | Varoglu et al. | |
| 2015/0262444 A1 | 9/2015 | Gilligan et al. | |
| 2016/0044719 A1 | 2/2016 | Sidhu et al. | |
| 2016/0164855 A1 | 6/2016 | Johansson et al. | |

OTHER PUBLICATIONS

Cheng et al., "An Introduction to Mutual SSL Authentication", Feb. 8, 2012, pp. 1-8 http://www.codeproject.com/Articles/326574/An-Introduction-to-Mutual-SSL-Authentication (Year: 2012).*

Carrier IQ, "Understanding Carrier IQ Technology" Dec. 12, 2011. pp. 1-19 http://www.franken.senate.gov/files/letter/111212_CarrierIQ_Attachment.pdf.

Cox, "What's really going on with Carrier IQ on your phone", Dec. 7, 2011 pp. 1-7 http://www.networkworld.com/article/2183839/smartphones/what-s-really-going-on-with-carrier-iq-on-your-phone.html.

Cheng et al., "An Introduction to Mutual SSL Authentication", Feb. 8, 2012, pp. 1-8 https://www.codeproject.com/Articles/326574/An-Introduction-to-Mutual-SSL-Authentication.

* cited by examiner

UNIFIED MOBILE SECURITY SYSTEM AND METHOD OF OPERATION

RELATED APPLICATIONS

This application is a divisional application of U.S. patent application Ser. No. 13/726,580, filed Dec. 25, 2012 and issued as U.S. Pat. No. 9,973,492 on May 15, 2018. The foregoing are incorporated by reference herein.

BACKGROUND

Conventional mobile wireless devices may be configured to collect quality of service statistics or under conditions collect and transmit data defined in a data collection profile and executed by an agent. User expectations of a sense of connectedness, and cradle to grave support services are potentially in conflict with a desire for privacy.

Thus it can be appreciated that what is needed is a way to securely collect and transmit private data exclusively to authorized recipients and to protect users from data leaks to unauthorized recipients and verify the provenance of data collection profiles prior to installation and execution at any mobile device.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

SUMMARY OF THE INVENTION

A system comprises a plurality of mobile secure agents each of which has received from a certificate authority a plurality of anchors, certificates, libraries, and related authentication modules. Upon determining conditions specified in at least one data collection profile, a mobile secure agent will transmit an encrypted data package to at least one certified data package collector. No transmission can occur to a collector without a certificate signed by a specific signing authority. Each of the private profile producers provides a certificate to a data package collector which has been authenticated by the unified mobile security certificate authority (CA). Each private profile producer validates an initial or updated data collection profile stored at a certified profile update provisioner. The update provisioner is enabled to establish a certificated SSL tunnel upon request from a mobile secure agent.

Each mobile secure agent requests a certificated SSL tunnel on its own schedule, on conditions encoded in a profile, or in response to a Black Short Message System (BSMS) transmission. Upon request from a private profile producer, a secure notifier will transmit a black short message system notification to at least one mobile secure agent that a new profile may be retrieved or that the data package collectors are ready for an upload, or that other key management messages are pending delivery.

Each private profile producer enables a data package collector to receive only data packages collected according to an authenticated profile signed by the private profile producer. The profiles are retrieved by the mobile secure agents through an SSL tunnel. A Certificate Authority can revoke or initialize new certificates for each private profile producer.

DETAILED DISCLOSURE OF EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 1:
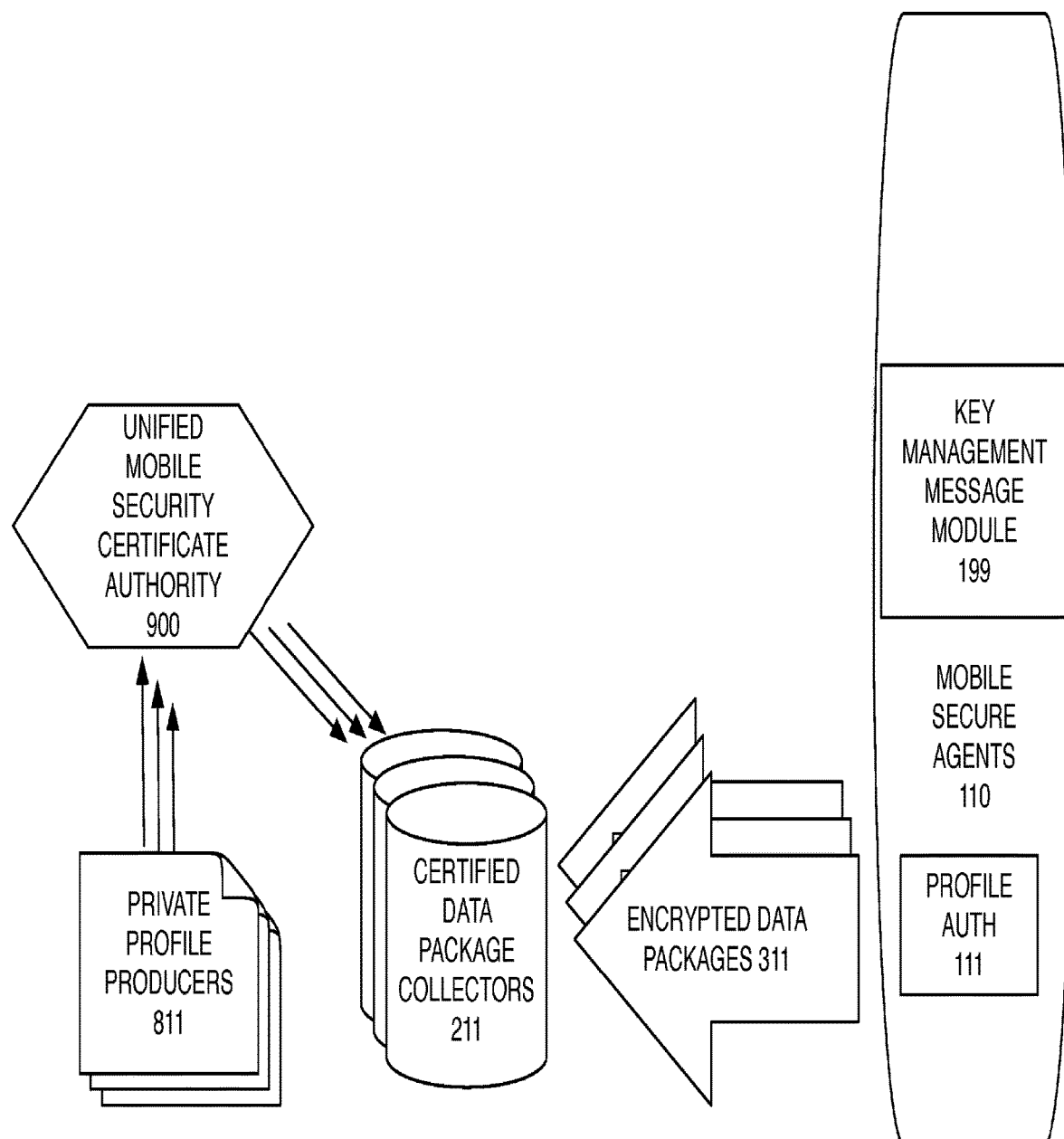
FIGS. 1-4 are block diagrams of embodiments of the system.

Referring now to FIG. 1, a system embodiment 100 has at least one of a plurality of mobile secure agents 110 installed in a mobile device which comprises a baseband processor, an application processor, display, and memory. The mobile secure agent comprises a Key Management Message Module 199 a combination of hardware and software which is provided by and signed by a unified mobile security certificate authority (CA) 900 in an embodiment a self-signed certificate authority. The CA has also authenticated at least one private profile producer 811. The mobile secure agent also has an authenticated profile 111 which has its own certificate and which can be validated or revoked by the Key Management Message Module 199. Upon discovery and evaluation of a set of conditions contained within the profile, the processor enables the mobile secure agent to collect data and to transmit data packages. Collected data may be discarded if the transmission conditions are never fulfilled. A data package may be encrypted and may be transmitted only to a certified data package collector 211 which has a corresponding key to receive the package and in an embodiment to decrypt the package. The data package may be encrypted only during transit or may be encrypted for storage. Thus the data package can only be transmitted to a package collector having the correct certificate and the encrypted data can only be decrypted by a collector having a key corresponding to the authenticated profile. Furthermore the data is collected and subsequently transmitted according to a profile authenticated by the Key Management Message Module 199 which comprises libraries, anchors, certificates, and executable code.

Figure 2:
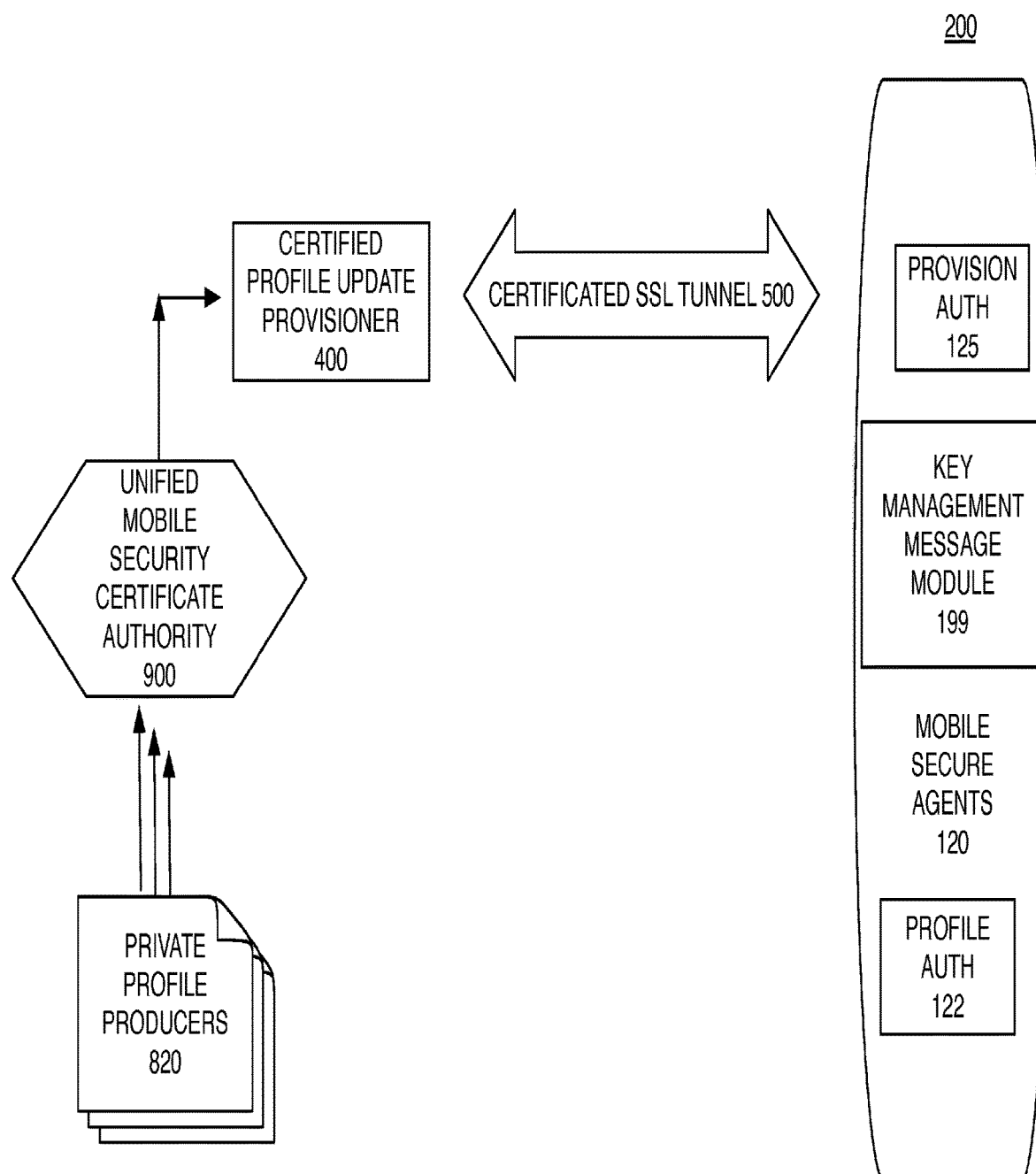

Referring now to FIG. 2, a private profile producer 820 is authenticated by the unified mobile security certificate authority (CA) 900 and generates an authenticated profile which is distributed by a certified profile update provisioner 400. A provision is initiated by a mobile secure agent 120 by launching a certificated SSL tunnel 500. The mobile secure agent 120 also comprises a provisioning authentication element 125 which starts the SSL tunnel, requests an updated profile, and authenticates the received profile 122 using the Key Management Message Module 199. All profiles are requested by the mobile secure agent from a certificated profile update provisioner and validated using the Key Management Message Module 199 provided by the CA 900. An aspect of the invention is the direction of this transfer which is initiated from the mobile device.

Figure 3:
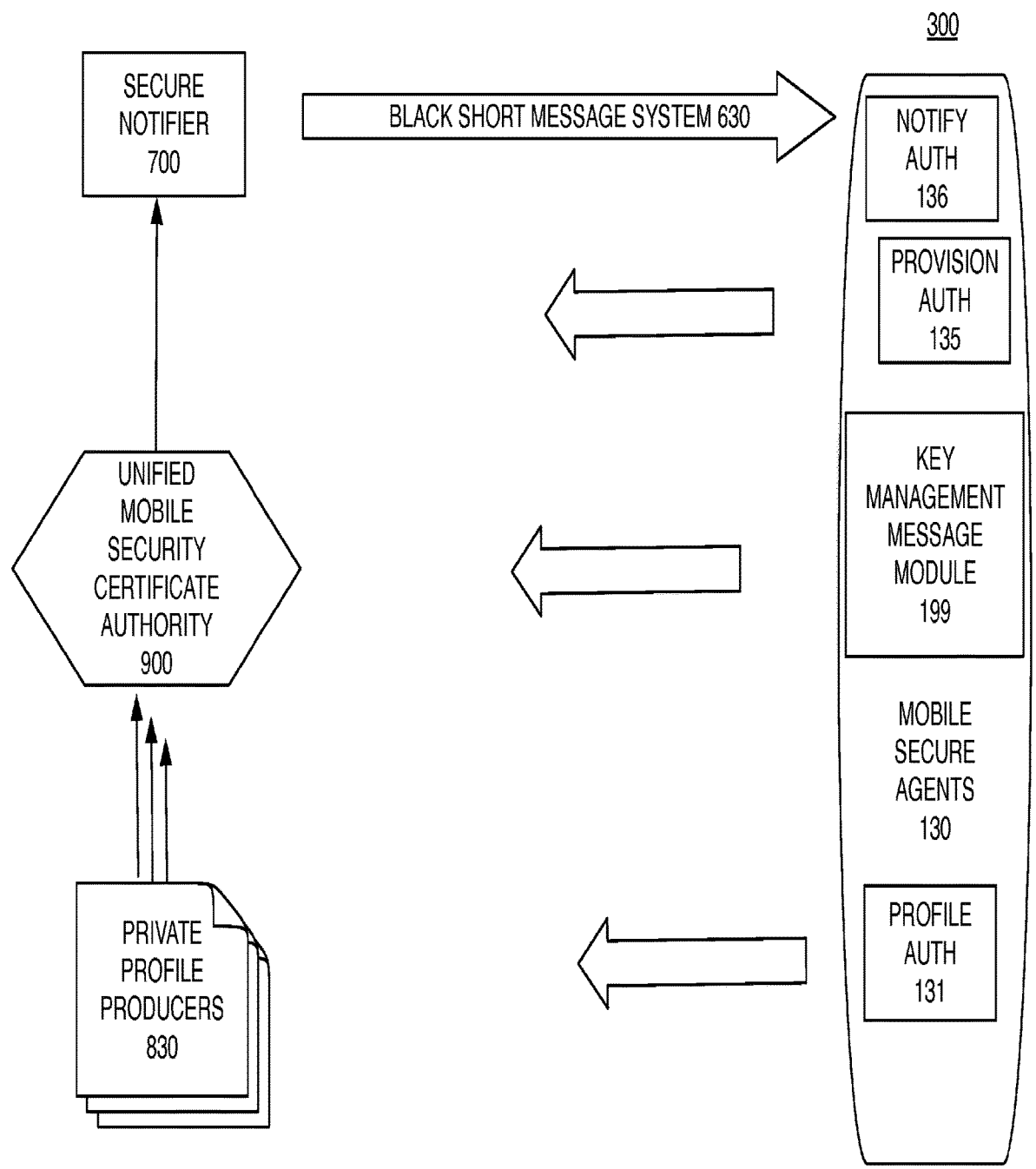

Referring now to FIG. 3, in an embodiment, a private profile producer 830 authenticated by the CA 900 may request a notification transmission by a secure notifier 700 which transmits a black short message system (BSMS) message 630 to a selected mobile secure agent 130. The notification is also authenticated by a notification authentication module 136. The notification can only trigger predefined operations at the mobile secure agent 130. In one embodiment, the notification causes the provisioning module to request an update profile from the profile provisioner. In an embodiment, the notification can alert the profile that a data package collector is available or reschedule a transmission of a data package. In an embodiment, the notification can initiate a request for an update to the Key Management Message Module. The Key Management Message may revoke a certificate and cause the Key Management Message Module 199 to advance to a new authentication anchor, thereby creating a new basis for authentications. As illustrated in FIG. 3, all the sessions which transmit payload are initiated by and from the Mobile Secure Agents to servers. The Short Message System provides triggers but cannot control the Mobile Secure Agents. We refer to a Black Short Message System to indicate that the SMS messages for notifications are not intended for display to the user of the mobile device.

Figure 4:
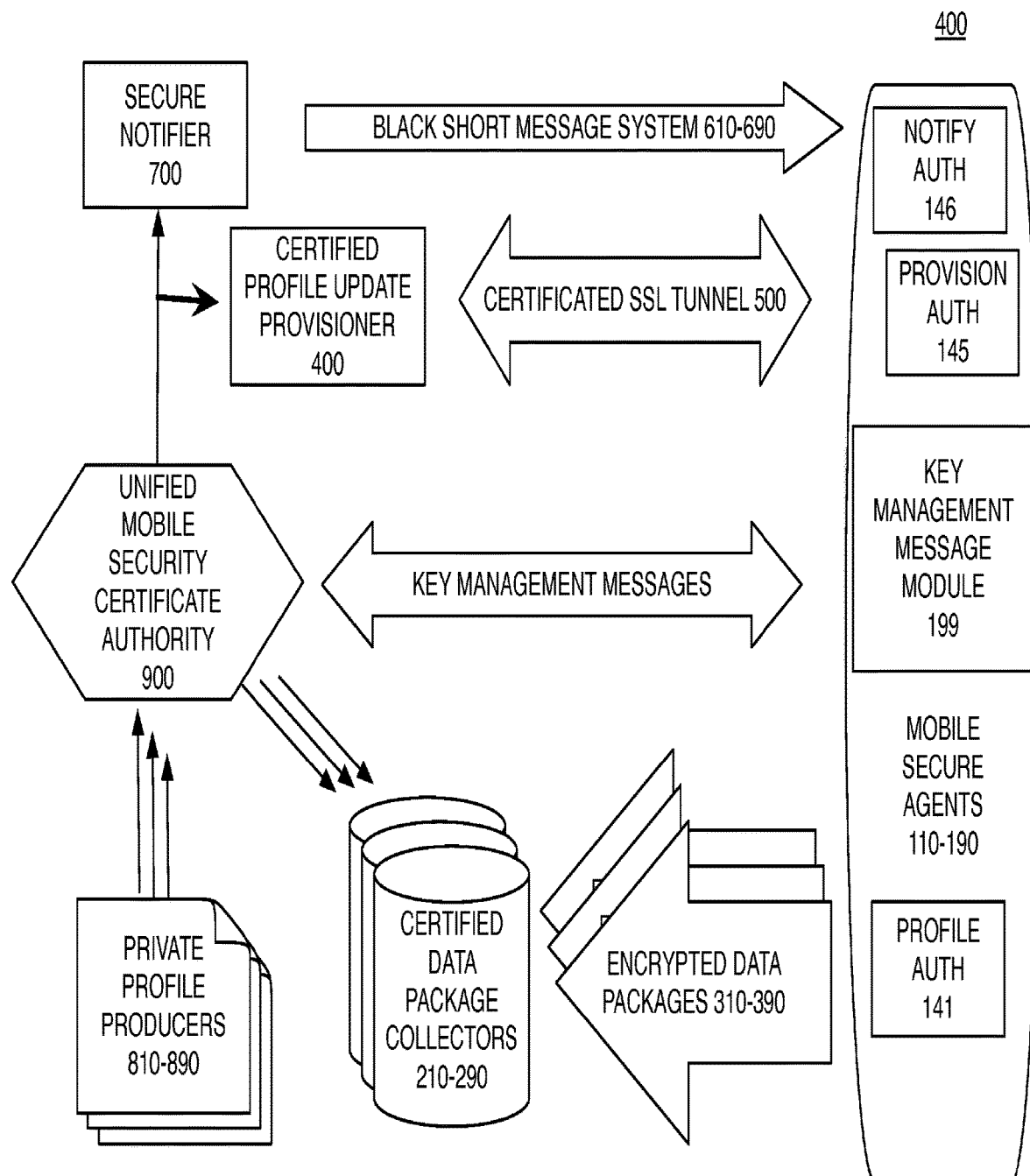

Referring now to FIG. 4, each of a plurality of private profile producers 810-890 submit new profiles for authentication by the CA which provides them to the profile update provisioner 400. The private profile producer may select a set of mobile secure agents to be notified to request the updated profile by the secure notifier 700. Each of the selected mobile secure agents 110-190 which are notified requests an updated profile by initiating an SSL tunnel 500, receiving and validating a new profile using the Key Management Message Module 199. Each data collection and transmission profile specifies conditions to collect certain data at the selected mobile device and other conditions to transmit the data packages to a certain certified data package collector. In a first embodiment, the data packages are encrypted prior to transmission and stored in encrypted form. In a second embodiment, the data packages are encrypted during transit but decrypted upon receipt at the collector. Certificates at the data package collectors prevent data packages from being misrouted to unauthorized receivers.

Figure 5:
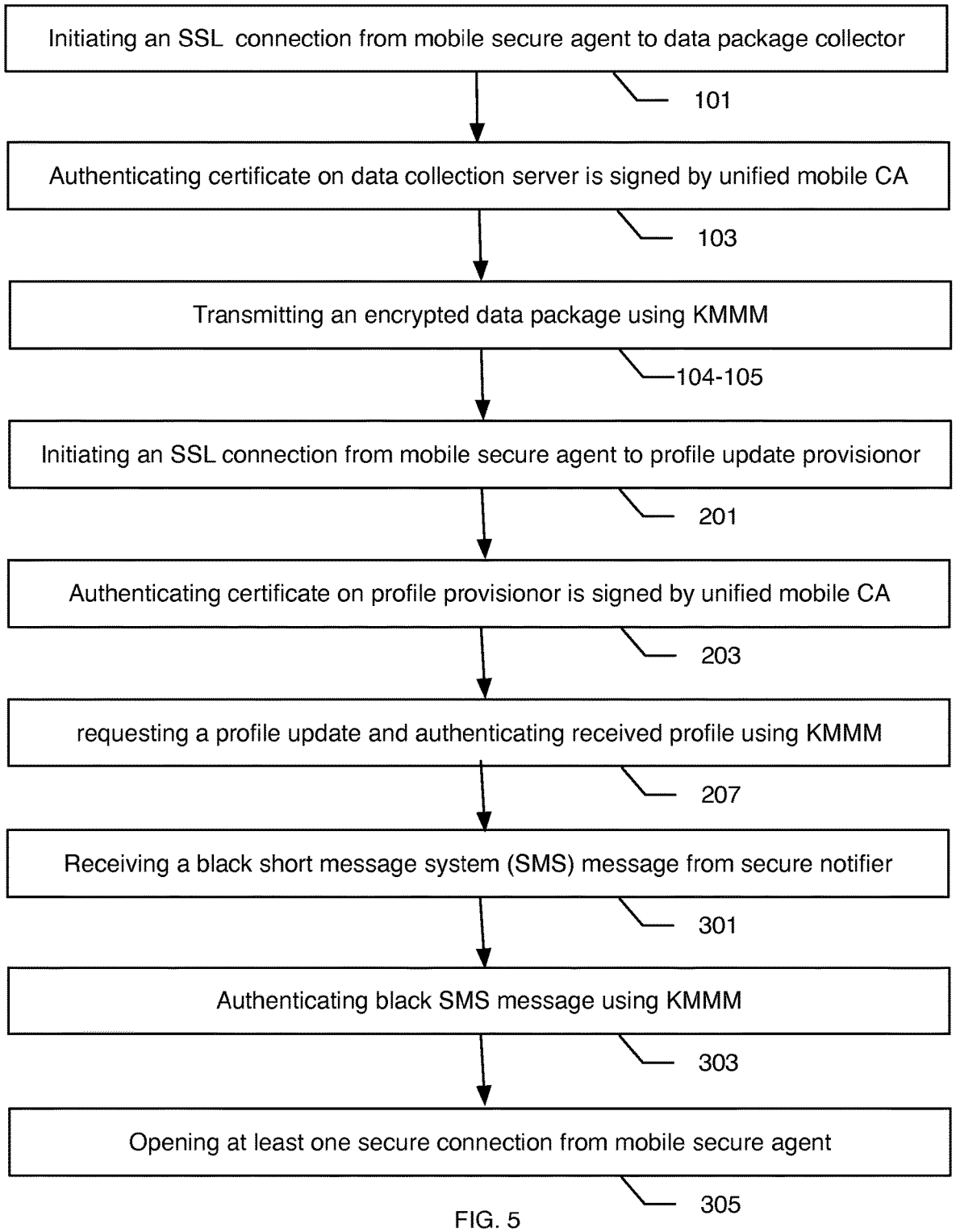
FIGS. 5-6 are flowcharts of method steps of a processor controlled as an aspect of the invention.

Referring now to FIG. 5, an exemplary method for operation of a mobile secure agent comprises, upon completing conditional collection of data according to a data collection profile and determining conditions for transmitting a data packages are fulfilled, initiating a secure connection to a certified data package collector server as specified within a profile 101, in an embodiment an HTTPS protocol known in the art, authenticating the data package collector server is certificated by the unified mobile security certificate authority (CA) 103, and transmitting the data package 105. In an embodiment, encrypting the data package 104 using a key provided in the Key Management Message Module. In an embodiment, the method further includes updating a profile: upon determining that it is necessary to update a data collection profile (either according to the extant data collection profile or according to a notification described below), initiating a secure connection by the mobile secure agent to a certified profile update provisioner server 201, authenticating the profile update provisioner server has a certificate signed by the unified mobile security certificate authority (CA) 203, requesting a profile update 205, authenticating the received profile update using the Key Management Message Module 207, and installing the new profile update 209. In an embodiment, the method further comprises receiving a black short message system (SMS) message 301 from a secure notifier, authenticating the black SMS message 303 using the Key Management Message Module, and opening at least one secure connection 305 from the mobile secure agent to obtain a profile update, a Key Management Message, or to transmit a data package to a data package collection server.

It can be appreciated that the benefit of the disclosed security architecture provided by the subject matter of this application enables certificates to be revoked and replaced. Data collected for one private profile producer cannot be received or decrypted by another private profile producer. Profiles are authenticated before use. Profiles are retrieved from a certificated profile update provisioner by the mobile secure agent and cannot be pushed to the mobile secure agent. Each notification can be authenticated and ignored if not authenticated. This provides a system where only private profile producers trusted by the enduser of the wireless mobile device may cause data to be collected and then under certain conditions transmitted to a data package collector authenticated by the profile. No data is collected and stored at the mobile secure agent unless a profile has been authenticated by the Key Management Message Module 199.

Figure 6:
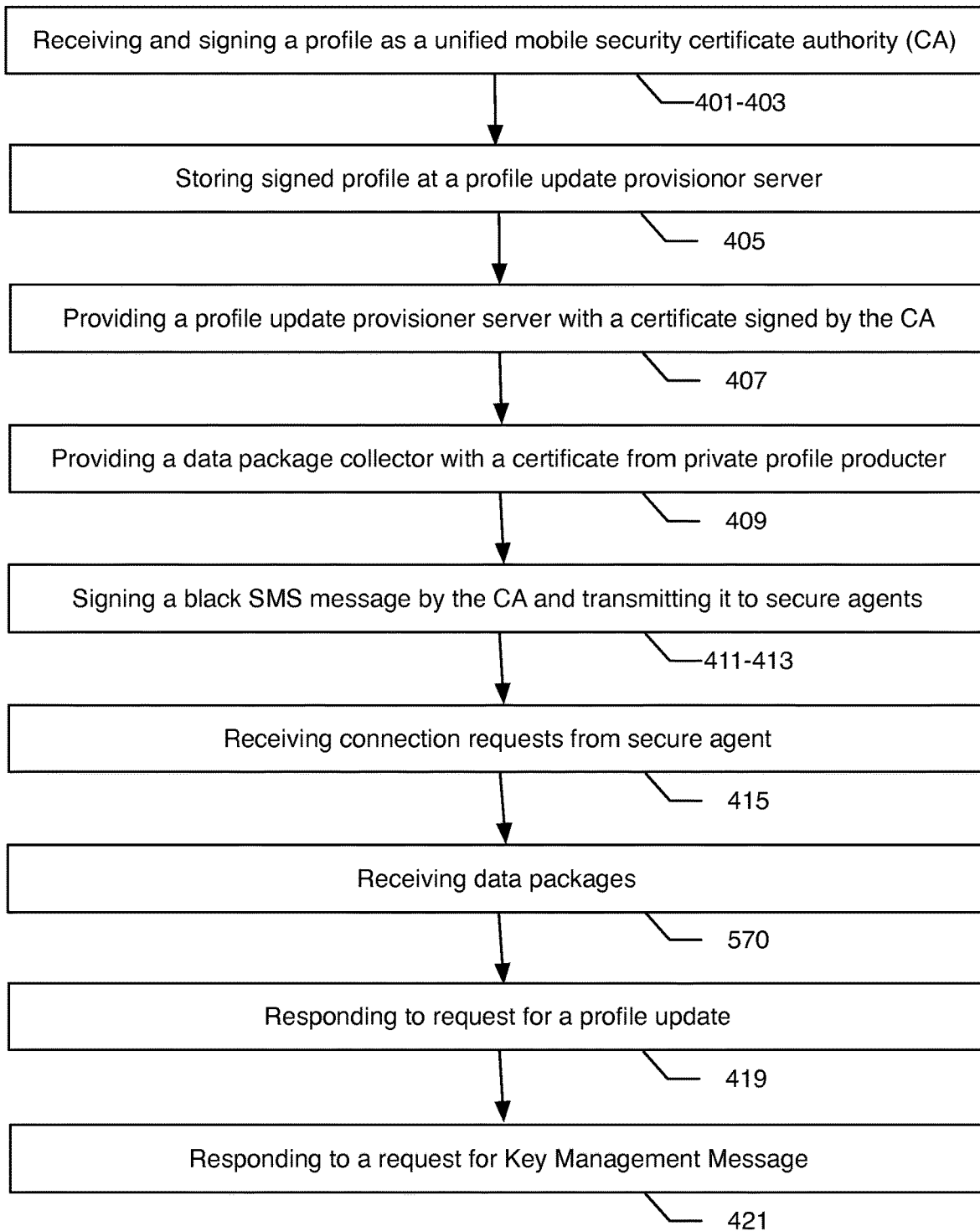

Referring now to FIG. 6, a method for operating a unified mobile security system comprises receiving a profile from a private profile producer 401, signing the profile as the unified mobile security certificate authority (CA) 403, storing the signed profile at a profile update provisioner server 405, providing the profile update provisioner server with a certificate signed by the unified mobile security CA 407, providing a certified data package collector with a certificate from the private profile producer signed by the unified mobile security CA 409, signing a black short message system (SMS) message by the unified mobile security CA 411 and transmitting it to selected mobile secure agents 413, receiving connection requests from a mobile secure agent 415, receiving data packages 417, responding to a request for a profile update 419, and responding to a request for an updated Key Management Message 421.

Other aspects of the invention are methods for operation of the mobile agent in control of a processor, methods for operation of a server to provision profiles, generate profiles, sign profiles and certificates, and provide key management modules. These methods and apparatuses are in embodiments:

A method for operating a mobile secure agent controlling a processor on a wireless mobile device, upon a condition in a profile evaluating as true, opening a secure SSL tunnel to a data package collector server using a certificate associated with the profile; encrypting a data package as specified in the profile; and transmitting the encrypted data package to the specified data package collector server having the associated certificate.

In another embodiment, the method further comprises upon receiving a black short message system notification and authenticating a signature associated with the notification, opening a secure SSL tunnel to a profile provisioning server using a certificate; requesting any updated profile; and authenticating the updated profile upon reception.

In another embodiment, the method further comprises upon receiving a request for a data package transmission in a notification, and authenticating the signature associated with the notification, opening a secure SSL tunnel to a data package collector server using a certificate; encrypting a data package as specified in a profile; and transmitting the encrypted data package to the specified data package collector server having a certificate.

Another aspect of the invention is at a unified mobile security certificate authority apparatus, a method comprising: generating a plurality of trust anchors; receiving a plurality of certificates from private signing authorities and authenticating each one; and provisioning a plurality of mobile secure agents with trust anchors, cryptographic libraries, default profiles, and at least one signed certificate.

At a private profile producer apparatus, the invention controls one or more processors to perform a method comprising: generating a certificate for authentication by a unified mobile security certificate authority; provisioning a data package collector with an authenticated certificate; distributing a certified profile update to a provisioner server; and directing a secure notifier apparatus to transmit a black short message system notification to a plurality of mobile secure agents to request an updated profile from the provisioner server. A conventional short message system which does not display certain messages to the user can be understood as a black short message system for notification.

An other aspect of the invention is a system communicatively coupled together by a network comprising: a secure notifier apparatus configured to receive a direction from a private signing authority and as a result, transmit a black short message system to at least one mobile secure agent controlling a processor on a wireless mobile device; a certified profile update provisioner server configured to receive a certificate and an updated profile, receive a request for an SSL tunnel, authenticate the tunnel request using the certificate, and transmit a certified profile to a mobile secure agent; a certified data package collector configured to receive a certificate from a private signing authority, receive a request from a mobile secure agent for a secure channel, authenticate using the certificate, and receive encrypted data packages for storage.

In an embodiment, the system further has at least one private profile producer apparatus, communicatively coupled to a unified mobile security certificate authority apparatus, and further coupled to the secure notifier apparatus, the certified profile update provisioner server and to a certified data package collector server.

In an embodiment, the system further includes the unified mobile security certificate authority apparatus coupled to a plurality of mobile secure agents configured with cryptographic libraries, default profiles, a plurality of authentication anchors and at least one certificate.

For expository clarity and illustrative simplicity separate connections are shown and described. However, as known to those skilled in the art, a single apparatus comprising a processor and memory can serve one or more of the disclosed functions. As an example, the profile provisioner server and the data collector servers may in an embodiment be virtual machines within a single apparatus. In an embodiment the separately shown secure connections initiated from the mobile secure agents may be all uses of a single protocol. In an embodiment, the one or more private profile producers may share occupancy of an apparatus together and in combination with the unified mobile security certificate authority as long as they do not have direct connection to the mobile secure agents. Similarly the secure notifier can be a conventional SMS apparatus but having the limitation of not providing messages visible to the user of the mobile device and including an authentication code within or associated with the message or series of messages.

CONCLUSION

The present invention is easily distinguished from non-unified security architectures which only provide piece-meal security solutions to mobile devices such as tablets, and smart phones. The present invention is easily distinguished from conventional security systems by its unified mobile security certificate authority. It can be appreciated that conventional wired network certificates are too voluminous for efficient use in a mobile wireless network. It is distinguishing characteristic that profiles and Key Management Messages and Modules are not "pushed" to mobile devices which would create an opportunity for unauthorized data leaks.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. A method for operating a mobile security system, the method comprising:
   generating a certificate for authentication by a unified mobile security certificate authority, wherein the certificate authenticates a private profile producer, wherein the private profile producer is configured to generate an authenticated profile for distribution to a mobile secure agent operating on a mobile device;

distributing a certified profile update produced by the authenticated private profile producer to an authorized provisioner server certified by the unified mobile security certificate authority; and directing a secure notifier apparatus to transmit a notification to the mobile secure agent to request the certified profile update from the authorized provisioner server;

provisioning a data package collector with an authenticated certificate such that the data package collector is authorized to receive a data package from the mobile secure agent that received the authenticated profile and the certified profile update, wherein the data package is based on the certified profile update and is encrypted when transmitted to the data package collector;

provisioning the data package collector with a key that allows the data package collector to decrypt the encrypted data package.

2. The method of claim 1, further comprising provisioning the mobile secure agent with trust anchors, cryptographic libraries, default profiles, and at least one signed certificate.

3. The method of claim 1, further comprising distributing the certified profile update to the mobile secure agent.

4. The method of claim 1, further comprising selecting a plurality of mobile secure agents to receive the certified profile update, wherein the plurality of mobile agents are the only mobile secure agents that received the authenticated profile that is updated by the certified profile update.

5. The method of claim 4, further comprising establishing a tunnel with the plurality of mobile secure agents based on requests from the plurality of mobile secure agents, wherein the requests are initiated by the plurality of mobile secure agents.

6. The method of claim 5, further comprising authenticating the certified profile update by the plurality of mobile secure agents after receiving the certified profile update from the private profile producer and before the certified profile update is installed.

7. The method of claim 1, wherein the certified profile update is encrypted prior to transmission to the mobile secure agent, and wherein the certified profile update specifies conditions to collect data and conditions for transmitting data packages, which include the collected data, to the authorized data package collector.

8. The method of claim 7, further comprising preventing the data packages from being misrouted to unauthorized data package collectors based on the authenticated certificate provisioned to the authorized data package collector.

9. The method of claim 1, wherein the notification comprises a black short message system notification.

10. A method comprising:

authenticating a private profile producer based on a certificate issued by a unified mobile security certificate authority;

requesting transmission of a notification to a selected mobile secure agent from the private profile producer;

receiving a request from the selected mobile secure agent for a certified update profile that was produced by the private profile producer and authenticated;

distributing the certified update profile to the selected mobile secure agent only in response to the request from the selected mobile secure agent; and collecting data based on the certified update profile and transmitting an encrypted data package, which includes the collected data, to a certified data package collector, wherein the certified data package collector is authenticated using a certificate from the unified mobile security certificate authority and wherein the data package collector includes a key that is configured to decrypt the encrypted data package.

11. The method of claim 10, further comprising authenticating the notification by the selected mobile secure agent prior to receiving the request.

12. The method of claim 11, wherein the notification triggers only pre-defined operations at the mobile secure agent and wherein the notification does not control the mobile secure agent.

13. The method of claim 10, further comprising revoking a certificate, at the selected mobile secure agent, and advancing a new authentication anchor to create a new basis for authentication at the selected mobile secure agent.

14. The method of claim 10, wherein all sessions that transmit payload from the selected mobile secure agent are initiated by the selected mobile secure agent.

15. The method of claim 10, further comprising submitting a plurality of profiles and the update profile produced by the private profile producer for authentication by the unified mobile security certificate authority.

16. The method of claim 10, further comprising selecting specific mobile secure agents as recipients of the certified update profile.

17. The method of claim 10, further comprising establishing a tunnel in response to the request from the selected mobile secure agent.

18. The method of claim 10, wherein the certificate associated with the certified data package collector prevents the data package from being accessed by unauthorized receivers of the data package.

* * * * *